United States Patent [19]

Falke et al.

[11] Patent Number: 5,112,787
[45] Date of Patent: May 12, 1992

[54] SUPPORTED CATALYST FOR OXIDIZING CARBON MONOXIDE

[75] Inventors: Holger Falke, Hemmingen; Guenther Strauss, Hanover, both of Fed. Rep. of Germany

[73] Assignee: GUTEC, Gesellschaft zur Entwicklung von Umweltschutztechnologie mbH, Hanover, Fed. Rep. of Germany

[21] Appl. No.: 537,597

[22] Filed: Jun. 14, 1990

[30] Foreign Application Priority Data

Jun. 22, 1989 [DE] Fed. Rep. of Germany ...... 3920427
Mar. 24, 1990 [DE] Fed. Rep. of Germany ...... 4009575

[51] Int. Cl.⁵ .............................. B01J 31/06
[52] U.S. Cl. .................. 502/159; 502/330; 502/527
[58] Field of Search .................. 502/330, 159

[56] References Cited

U.S. PATENT DOCUMENTS

| | | | |
|---|---|---|---|
| 3,925,248 | 12/1975 | Moroni et al. | 502/159 |
| 4,158,643 | 6/1979 | Sinha | 252/447 |
| 4,185,082 | 1/1980 | Sinha | 423/437 |
| 4,698,324 | 10/1987 | Haruta et al. | 502/330 |
| 4,839,327 | 6/1989 | Haruta et al. | 502/330 |

FOREIGN PATENT DOCUMENTS

| | | |
|---|---|---|
| 95313 | 11/1983 | European Pat. Off. |
| 246031 | 11/1987 | European Pat. Off. |
| 3522287 | 1/1987 | Fed. Rep. of Germany |
| 906299 | 12/1945 | France |
| 2083829 | 3/1982 | United Kingdom |
| 2166061 | 4/1986 | United Kingdom |

OTHER PUBLICATIONS

Rideal, Eric K., *Concepts in Catalysis,* Academic Press (1968), pp. 4–5.
Haruta et al., "Novel Gold Catalysts . . . ", *Chemistry Letters,* pp. 405–408 (1987).
Chemical Abstracts 105:65657a (abstract of Haruta et al., Japanese Apl. No. JP 60/238,148).
Chemical Abstracts 84:80369z (abstract of Sakai et al., Japanese Apl. No. JP 50/98,487 (1975)).
Chemical Abstracts 94:24540t (abstract of Japanese Patent Apl. 55/94,153 (1980)).
Chemical Abstracts 85:167306w (abstract of Shinha, German Patent Apl. DE 2,610,287).

*Primary Examiner*—Patrick P. Garvin
*Assistant Examiner*—Brent M. Peebles
*Attorney, Agent, or Firm*—Foley & Lardner

[57] ABSTRACT

Supported catalysts for oxidizing carbon monoxide at temperatures below about 50° C. are described which comprise an open-celled, foamed, organic polymer support and a catalytically active component applied to the support, wherein the catalytically active mixture is a mixture of gold and iron oxide, cobalt oxide or nickel oxide or a mixture of these mixtures.

15 Claims, No Drawings

SUPPORTED CATALYST FOR OXIDIZING CARBON MONOXIDE

BACKGROUND OF THE INVENTION

This invention relates to a supported catalyst for oxidizing carbon monoxide, to a process for producing a supported catalyst, and to a process for oxidizing carbon monoxide using a supported catalyst according to the invention.

Carbon monoxide is a gaseous compound which is used in a large number of industrial processes, for instance in the production of methane from carbon monoxide and hydrogen. Carbon monoxide is also produced as an unwanted pollutant during incomplete combustion and is contained, for example, in exhaust gases from internal combustion engines. Finally, carbon monoxide also occurs naturally, for instance in coal mines.

Due to its toxicity, carbon monoxide should be present in inhaled air in the smallest quantities possible. A decrease in the carbon monoxide content of exhaust air from industrial plants or in inhaled air is therefore desirable and, if the content is too high, necessary. It has been known for many years that the oxidation of carbon monoxide to carbon dioxide can be accelerated catalytically. Catalysts which are active at as low a temperature as possible, for instance at ambient temperature, and remain active as far as possible in the presence of moisture are particularly advantageous, since they are highly suitable for use, for example, in rescue apparatus having an uncomplicated design. For instance, mixtures of gold and certain oxides of the metals iron, cobalt and nickel which are made as full catalysts are highly suitable. As the authors M. Haruta, T. Kobayashi, H. Sano and N. Yamada write in Chemistry Letters, pages 405 to 408, (1987), mixtures of gold and the aforementioned metal oxides, obtained by coprecipitation and calcination for four hours at temperatures of 400° C., are capable of catalyzing the oxidation of carbon monoxide at ambient temperature, even in the presence of moisture for long periods.

In principle, it is certainly desirable to apply catalytically active metals to supports, particularly naturally valuable precious metals, since the catalytic activity can then be utilized more effectively. Predominantly, ceramic support materials are used, although organic materials may also be used. Polymeric organic foamed plastics as support materials have additional advantages compared to ceramic materials. For instance, they are advantageously light, and they are not susceptible to vibrations or mechanical shocks or impacts within certain limits.

However, the aforementioned authors have shown that gold, applied to a ceramic support, namely gamma-aluminum oxide, even after calcination at 200° C., only developed significant catalytic activity during the oxidation of carbon monoxide at temperatures above about 100° C. Both the high calcination temperature which is necessary for producing a supported catalyst and the high operating temperature of the supported catalyst needed to achieve a significant activity would lead a person skilled in the art to conclude that organic material would a priori not be considered as a support for this catalytically active material or for this purpose, namely the oxidation of carbon monoxide.

SUMMARY OF THE INVENTION

It is the object of the present invention to provide new supported catalysts with advantageous properties for oxidizing carbon monoxide.

Another object of the invention is to provide supported catalysts for oxidizing carbon monoxide which are easy to handle.

A further object of the invention is to provide supported catalysts for oxidizing carbon monoxide which exhibit good mechanical stability.

Another object of the invention is to provide a process for oxidizing carbon monoxide at temperatures below about 100° C.

These and other objects of the invention are achieved by providing a supported catalyst for oxidizing carbon monoxide at a temperature below about 100° C., comprising a foamed, substantially open-pored organic polymer support, and a catalytically active component applied to the support, wherein the catalytically active component comprises a mixture of gold and iron (III) oxide, a mixture of gold and tricobalt tetroxide, a mixture of gold and nickel (II) oxide, or a mixture of two or more of the foregoing mixtures.

In accordance with a further aspect of the invention, the objects are achieved by providing a process for producing a supported catalyst for oxidizing carbon monoxide, comprising the steps of: A) producing a catalytically active component comprising a mixture of a gold compound and an iron (III) compound, a mixture of a gold compound and a cobalt compound, a mixture of a gold compound and a nickel compound, or a mixture of at least two of the foregoing mixtures; calcining the mixture at a temperature above 200° C.; and grinding the resulting solids to particle sizes below about 2 mm; and B1) for producing a supported catalyst with said catalytically active component homogeneously distributed in the support, mixing an organic prepolymer with the catalytically active component obtained in step A), and polymerizing the resulting mixture with foaming; or B2) for producing a coated supported catalyst, coating a foamed, substantially open-pored organic polymer support with the catalytically active component obtained in step A).

In accordance with yet another aspect of the invention, the objects are fulfilled by providing a process for oxidizing carbon monoxide, comprising passing a gas containing carbon monoxide and oxygen at temperatures below about 100° C. through a supported catalyst which comprises a foamed, substantially open-pored organic polymer support, and a catalytically active component applied to the support, wherein the catalytically active component comprises a mixture of gold and iron (III) oxide, a mixture of gold and tricobalt tetroxide, a mixture of gold and nickel (II) oxide, or a mixture of two or more of the foregoing mixtures.

The invention also includes a method of supplying air having a decreased carbon monoxide content to an interior passenger compartment of a vehicle, comprising passing air containing an undesired amount of carbon monoxide through a supported catalyst comprising a foamed, substantially open-pored organic polymer support and a catalytically active component applied to the support, wherein the catalytically active component comprises a mixture of gold and iron (III) oxide, a mixture of gold and tricobalt tetroxide, a mixture of gold and nickel (II) oxide, or a mixture of two or more of the foregoing mixtures, whereby carbon monoxide is oxidized to produce air containing a decreased amount of carbon monoxide, and subsequently introducing the air containing a decreased amount of carbon monoxide into the passenger compartment.

DETAILED DESCRIPTION OF PREFERRED EMBODIMENTS

The supported catalyst according to the invention for oxidizing carbon monoxide at temperatures below about 100° C. is characterized by a foamed, substantially open-pored organic polymer as the support and a catalytically active component which contains a mixture of gold and iron (III) oxide, a mixture of gold with tricobalt tetroxide, a mixture of gold and nickel (II) oxide or mixtures of these mixtures.

In the supported catalyst according to the invention, the catalytically active component may be homogeneously distributed in the polymer and/or it may be present as a coating on the polymer. In preferred supported catalysts, the catalytically active component is present as a coating on the polymer.

In principle, all known foamed, substantially open-pored organic polymers are usable as supports within the scope of the present invention. A large number of such polymers having different properties are known to persons skilled in the art. For instance, foamed polymers (foam plastics) of widely differing hardness, ranging from soft foams to hard foams, may be used. The pore size may suitably be in the range from 0.1 to 10 mm, and the density of the foam may be in the range from 0.005 and 0.05 g/cm$^3$.

It is of decisive importance that a substantially open-pored organic polymer is used as a support. Pores are cavities in the respective polymer. In this case, open pores are connected to the surrounding medium, while closed pores are closed in themselves and do not allow penetration by the surrounding medium. Within the scope of the present invention, the term "open-pored" refers to those pores which are connected via openings in the pore wall with other pores and in this manner ultimately with the surrounding medium, for instance the ambient air.

Generally, the higher the proportion of open pores in a foamed polymer, the more suitable the polymer will be as a catalyst support material through which gas flows. In principle a polymer which has a fairly large proportion of closed pores as well as open pores, and thus is mixed-pored, may also be used as a catalyst support in the present invention. However, the smaller effective surface area and the higher pressure drop make the use of such a mixed pore polymer appear generally less advantageous. Within the framework of the present invention, therefore, substantially open-pored polymers are used as supports. As used herein, the term "substantially open-pored" means that a substantial proportion, for instance about 90% or more, preferably from 95 to about 100%, of the pores contained in the polymer foam should be open.

It is known that foamed polymers occur in closed-pore, mixed-pore or open-pore form depending on the way in which they are produced. Closed-pore, mixed-pore and open-pore foams are sometimes also referred to as closed-cell, mixed-cell and open-cell foams, respectively. It is also known that closed pores which may be present can be converted into open pores by chemical or physical methods. This process is called reticulation. Within the scope of the present invention, foamed organic polymers may be used which are directly substantially open-pored when produced. Equally, substantially open-pored foamed polymers which are initially closed-pored or mixed-pored when first produced and are subsequently reticulated may also be used.

A large number of foamed, substantially open-pored organic polymers made of widely differing chemical materials are known to persons skilled in the art and may be used as supports in the supported catalysts of the present invention. For instance, polymers based on polystyrene, styrene copolymers, polyvinyl chloride or polyurethane are highly suitable. Foamed, substantially open-pored organic polymers based on polyurethane are highly suitable. These are available in the form of soft to hard foam plastics and may be produced in known manner from isocyanates and water, carboxylic acids, diols, glycol ethers, or polyols, if desired in the presence of propellant gases, emulsifiers and other additives. Particularly suitable open-pored polyurethane foams are commercially available from Illbruck of Leverkusen, Germany under the names SPPI 10, 15, 20, 30, 45, 60, 80 or 100. These particular foamed plastics have 10, 15, 20, 30, 45, 60, 80 or 100 pores per inch, respectively.

The content of catalytically active component in the supported catalyst according to the invention may vary within a wide range. Advantageously, the catalytic component is present in a quantity of from 5% by weight to 80% by weight, preferably from 10% by weight to 50% by weight, relative to the total weight of the supported catalyst. If it is present in smaller quantities than those given, the degree to which the carbon monoxide is oxidized may fall to a value which is too low. If it is used in larger quantities than those given, the precious metal content may not be utilized effectively.

If the gold is present in a mixture with iron (III) oxide, the atomic ratio of gold to iron is desirably in the range of about 1:999 to about 1:4, preferably between about 1:99 and about 1:9, particularly preferably between about 1:49 and 1:14.

If the gold is present in a mixture with tricobalt tetroxide, the atomic ratio of gold to cobalt is desirably in the range also given for iron.

If the gold is present in a mixture with nickel (II) oxide, the atomic ratio of gold to nickel is desirably in the range of 1:49 to 1:8.

In a preferred embodiment, the catalytically active component contains a mixture of gold and iron (III) oxide. In a particularly preferred embodiment, the catalytically active component consists of a mixture of gold and iron (III) oxide.

The catalytically active component should as far as possible be present on the support or be contained in the support in the form of small particles, advantageously in particles smaller than 2 mm. Supported catalysts which are coated with a catalytically active component having a particle size between 10$\mu$ and 200$\mu$ are considered highly suitable.

The supported catalyst according to the invention may take very varied forms. For instance it may be in the form of monolithic bodies having the shape of cubes, blocks, plates or spheres. The spatial volume of the supported catalyst may lie in the range from a few cubic centimeters, for instance 5 cm$^3$, up to several liters, for instance 10 or more liters.

Processes for producing the supported catalysts according to the invention will now be described.

The process according to the invention for producing a supported catalyst for oxidizing carbon monoxide, comprising a catalytically active component which contains a mixture of gold and iron (III) oxide, a mixture of gold and tricobalt tetroxide, a mixture of gold and nickel (II) oxide or mixtures of these mixtures, and also a foamed, substantially open-pored organic polymer as a support, comprises the steps of A) producing a catalytically active component comprising a mixture of a gold compound and an iron compound, a mixture of a gold compound and a cobalt compound, and/or a mixture of a gold compound and a nickel compound, calcining the mixture at temperatures above 200° C., and grinding the resulting solids to particle sizes below 2 mm, and B1) for producing a supported catalyst with catalytically active component homogeneously distributed in the support, mixing an organic prepolymer with the catalytically active component obtained in step A), and polymerizing the resulting mixture with foaming, and optionally reticulating closed cells which are present; or B2) for producing a coated supported catalyst, coating a foamed, substantially open-pored organic polymer support with the catalytically active component obtained in step A).

To produce the catalytically active component in step A) therefore, in a first step a mixture of a gold compound and an iron, cobalt and/or nickel compound is produced. For reasons of simplicity, only the production of a mixture of a gold compound and an iron compound will be described in detail below. Mixtures with cobalt or nickel compounds can also be produced in a similar manner.

The desired mixture of a gold compound and an iron compound may be obtained according to various variants.

In accordance with one variant, a solution is produced which contains a dissolved gold compound and a dissolved iron compound. After the removal of the solvent, for instance by evaporation, the desired mixture of a gold compound and an iron compound is obtained.

In accordance with another variant, iron oxide (e.g. hematite) is used as the iron compound, and the iron oxide is impregnated with a solution of a gold compound. The mixture obtained upon impregnation may be dried if desired.

In accordance with a preferred variant, a solution initially is produced which contains a dissolved gold compound and a dissolved iron compound. A co-precipitated mixture of a gold compound and an iron compound, for instance a co-precipitated mixture of gold hydroxide and iron (III) hydroxide, is produced by adding a precipitating agent, for instance a base, which is effective for both types of metal. This mixture can then be dried if desired.

Organic solvents, for instance alcohols, nitriles such as acetonitrile, or other solvents such as dimethylformamide, may be used as solvents in the variants described above, optionally in admixture with water. The preferred solvent is pure water.

Examples of salts which may be used as suitable gold compounds include salts which contain gold cations, for instance gold halides, particularly gold trichloride. Salts having complexed gold cations may also be used. Examples of suitable complexing agents include ammonia or primary, secondary or tertiary amines substituted with lower alkyl groups. For example, gold (diethylamine) trichloride may be used.

Gold compounds which contain gold in the form of complex anions may also be used. The auric acids such as haloauric acids, particularly tetrachloroauric acid, cyanoauric acid or nitratoauric acid, and the corresponding alkali metal salts, for instance the potassium salt, may suitably be used. If desired, hydrated auric acids or salts thereof may be used. In the process of the present invention, tetrachloroauric acid tetrahydrate is preferably used as the soluble gold compound.

The concentration of the solution of the gold compound is not critical. It is advantageously between about 5 grams per liter and 100 grams per liter of solvent.

Advantageously solutions of salts of trivalent iron are used to produce iron salt solutions. When using salts of bivalent iron, an oxidative treatment should also follow for converting the iron into trivalent iron. This may, for instance, be effected by atmospheric oxygen present during the calcination process described hereinafter. For example, iron salts with the anions of organic acids, such as formic acid, but preferably salts with the anions of inorganic acids, may be used. Suitable examples include iron halides and iron pseudohalides, in particular iron chloride. Iron nitrate is highly suitable. The concentration of the iron salt is advantageously between about 10 and 100 grams per liter of solvent.

In accordance with a preferred embodiment, a preferably aqueous solution which contains a dissolved gold compound, preferably tetrachloroauric acid, and a dissolved iron compound, preferably iron nitrate, is first produced, and the resulting solution is contacted with a precipitating agent, for instance with a base. Examples of suitable bases include basic alkali metal compounds or ammonium compounds, e.g. ammonium hydroxide, sodium hydroxide solution or potassium hydroxide solution, or carbonates or hydrogen carbonates of sodium, potassium or ammonium. Ammonium compounds are particularly suitable, especially ammonium carbonate. The base is advantageously used in the form of a solution, particularly in the form of an aqueous solution. The concentration is not critical and may advantageously lie between 10 grams per liter and 300 grams per liter.

In a preferred embodiment, when producing the mixture of gold compound and iron compound, quantities are used which correspond to an atomic ratio of gold to iron of 1:999 to 1:4, preferably of 1:99 to 1:9, particularly preferably of 1:49 to 1:14.

The mixtures of gold compound and compound of iron, cobalt or nickel which are obtainable according to any of the methods described above may be dried, if desired, at temperatures between 50° and 150° C. The optionally dried mixture is calcined at a temperature of at least 200° C. to convert it into the catalytically active component. This may take place in an inert gas atmosphere, such as nitrogen. Advantageously, the calcination takes place in air. Calcination may be carried out over a period of several hours, for instance from 1 to 24 hours. It is only by this calcination that the mixture is activated and can then be used as the catalytically active component for oxidizing carbon monoxide at temperatures below about 100° C. The calcination temperature is preferably between about 250° C. and about 500° C.

Advantageously, the catalytically active component should be applied to the support material in the form of particles which are as small as possible. Particle sizes of less than 2 mm are particularly suitable. If the catalytically active component is not present in the form of suitably small particles after calcination, it is desirably crushed by known processes, for instance by ball mills or beater mills, to particle sizes of less than about 2 mm. Preferably particle sizes below 200μ are used, particularly preferably particle sizes between about 10μ and 200μ.

The catalytically active component from step A) is processed further in step B1) or step B2) to produce a supported catalyst according to the invention.

In this case, accordingly two variants are possible. In variant B1), the catalytically active component obtained in step A) is mixed with a prepolymer and, if desired, with conventional additives for producing foamed, organic polymers, such as foam stabilizers, surfactants, propellant gases, reaction accelerators, etc. The resulting mixture is then polymerized with foaming in a known manner. If desired, any closed cells which are present may be reticulated by known techniques. With this method, a supported catalyst is obtained in which the catalytically active component is evenly distributed throughout the support material.

The preferred production process envisions a combination of steps A) and B2). According to variant B2), a foamed, substantially open-pored organic polymer is used as the support, and the polymer support is coated with the catalytically active component from step A). In this case, supported catalysts are obtained which comprise a foamed, substantially open-pored organic polymer support coated with the catalytically active component. This process variant leads to particularly advantageous supported catalysts.

In principle, any known foamed, substantially open-pored organic polymer, as already described above, can be used as a support in step B2) in the process of the present invention to produce a supported catalyst according to the invention. The pore size of the support preferably will be in the range from 0.1 to 10 mm, and the density of the foam preferably lies in the range from 0.005 to 0.05 g/cm$^3$.

Particularly preferably, polymers based on polystyrene, styrene copolymers, polyvinyl chloride or polyurethane are used in the process of the present invention. Polymers based on polyurethane are especially preferred. For instance, the aforementioned SPPI types produced by Illbruck, of Leverkusen, Germany are considered especially suitable.

Advantageously, the catalytically active component is introduced in step B1) or applied in step B2) in such a quantity that the finished catalyst will contain the catalytically active component in a quantity of from 5% by weight to 80% by weight, preferably 10% by weight to 50% by weight, relative to the total weight of the ready to use, supported catalyst.

Besides the possibility of using mixtures of gold and iron (III) oxide, gold and tricobalt tetroxide or gold and nickel (II) oxide as the catalytically active component applied to or introduced into the support, it is also possible to apply to the support or introduce into the support mixtures of any two or of all three of these mixtures. For instance, a mixture of gold and iron (III) oxide and then a mixture of gold and nickel (II) oxide can be applied successively to the support.

In a preferred embodiment, the support is coated with a catalytically active component which contains a mixture of gold and iron (III) oxide, particularly preferably with a catalyst mixture which consists of gold and iron (III) oxide.

The foamed polymer may be used as a support material in varying forms. For instance, it may be a body of any size ranging from a few cubic centimeters spatial volume up to several liters, for instance 10 or more liters, spatial volume, and may take the form of monolithic cubes, blocks, plates or spheres.

The polymer which is provided as the support material and/or the oxide material which is to be applied as the catalytically active component is advantageously subjected to a pretreatment which improves the adhesion of the catalytic particles to the polymer surface. For instance, the particles can be brought to elevated temperature, for instance to about 150° to 250° C., and then introduced into contact with the support material, for instance by being allowed to trickle through the support material in a fluidized bed system. The polymer surface softens due to the high temperature of the particles, and the catalytically active component is fixed to the polymer surface as a coating. Other possible pretreatments include treating the surface of the polymer with a solvent which causes solubilization of the surface, pretreating the polymer foam support with an adhesive which is to be applied (as thinly as possible), treating the polymer support with a gas which corrodes the surface of the polymer and/or thermally treating the polymer to soften and tackify the polymer surface.

Additionally or alternatively, the catalytically active component may be fixed in the support by enveloping the support with suitable agents, for instance gauze.

The optionally pretreated support material may be coated with the finely-powdered catalytically active component, for example in a fluidized bed system.

Surprisingly, the supported catalysts according to the invention have proved usable for oxidizing carbon monoxide at temperatures below about 100° C. They are catalytically active even in the presence of moisture (water vapor). The carbon monoxide which is to be oxidized in the gas mixtures which are to be purified may be contained in a relatively low concentration, for instance in a concentration of about 5 ppm to 100 ppm, but also in higher concentrations, up to 1% by volume or more. The supported catalysts according to the invention are particularly well suited for oxidizing carbon monoxide in air which may optionally contain moisture, at temperatures below about 100° C. They are useful, for example, in air conditioning and in so-called self rescue equipment, as used, for instance in mines, industrial factories and in fire and rescue departments, and also in the processing of industrial exhaust air.

According to a further aspect of the invention, a process is provided for oxidizing carbon monoxide at temperatures below about 100° C., in which a gas containing carbon monoxide and oxygen is passed through a supported catalyst as described above. The oxygen content should desirably correspond at least to the quantity required for complete oxidation of the carbon monoxide.

A process in which carbon monoxide-containing air is passed through a supported catalyst obtainable according to one of the above described production processes is preferred. The air may be dry air, or it may be moist air which contains water vapor in small quantities up to the saturation point, for instance between about 0.1% and 80% relative humidity.

Preferably, the process for oxidizing carbon monoxide is carried out at temperatures below about 50° C., in particular at ambient temperature, i.e. between about 15° and about 25° C.

The exhaust gases of internal combustion engines are one source of carbon monoxide air pollution. This exhaust air which is polluted with carbon monoxide is at the same time the air inhaled by people in traffic, for instance drivers and passengers of cars, trucks and busses. A special field of application of the supported catalyst according to the invention is in the purification of the air which is supplied to the interiors of vehicles such as cars, trucks or buses. The supported catalysts according to the invention fulfill this function very well, since they can effectively remove the carbon monoxide content from air at low temperature without requiring energy. They are active over an extended period of time, and their activity is not affected by, or scarcely affected by, the naturally changing moisture content of the air which is to be purified.

The supported catalysts according to the invention have the surprising advantages that they are active at low temperatures even in the presence of moisture; that they permit economic utilization of the precious metal gold which is used; that they are very light; that they can be handled easily, for instance they can be cut to the desired size on the spot; that they are stable against impacts and shocks, and that they can be produced very easily.

The following examples are intended to illustrate the invention in further detail without, however, restricting its scope.

EXAMPLE 1

1.1 Production of the Catalytically Active Component (Step A of the Production Process)

An aqueous solution containing 7 grams per liter gold and 38 grams per liter iron was produced by dissolving tetrachloroauric acid and iron (III) nitrate in distilled water. 10 ml of an aqueous solution containing 290 grams of ammonium carbonate per liter, were added to 14 ml of the aqueous gold and iron solution while stirring. The solids which were precipitated were separated by filtration, dried at about 25° C. for a period of 24 hours, and then calcined for 5 hours at a temperature of about 400° C. The calcined solids were then crushed in a beater mill to a particle size of 50 to 100μ. Yield: approximately 750 mg.

1.2: Coating of the Support Material with the Catalytically Active Component (Corresponds to Step B2 of the Production Process)

A soft polyurethane foam which had a density of 0.02 g/cm$^3$ and a pore size of 0.5 mm was used as the support material. The support material was used in the form of a cylindrical foam block 2 cm in diameter. The polyurethane foam was first pretreated by rinsing with a contact adhesive (Henkel-Sichello, J 6613R contact adhesive). 700 mg of the gold/iron oxide mixture produced in Example 1.1 were applied to the support material, which weighed about 1 g. Then the resulting supported catalyst was dried at 80° C. for 16 hours.

EXAMPLE 2

Use of the Supported Catalyst Produced in Example 1 for Oxidizing Carbon Monoxide A 2 cm diameter glass tube provided with gas supply and gas removal means was used as a container. The catalyst produced in Example 1 was placed in the tube, and a stream of air having a relative humidity of 80%, a temperature of 22° C. and a carbon monoxide concentration of about 50 ppm was passed through the supported catalyst in the container at a rate of 28 liters per hour. After passing through the supported catalyst according to the invention, the carbon monoxide concentration in the air stream was only about 18 ppm.

EXAMPLE 3

3.1 Production of the Catalytically Active Component (Step A of the Production Process)

An aqueous solution containing gold and iron was produced as described in Example 1.1. However, this time about 10 liters of this aqueous solution were used, and about 7 liters of an aqueous solution containing 290 grams of ammonium carbonate per liter were added thereto with stirring. The solids which precipitated were worked up and calcined as in Example 1.1. The calcined solids were then crushed to a particle size of about 0.25 to 1.3 mm. Yield: approximately 540 g.

3.2 Coating the Support Material with the Catalytically Active Component (Corresponds to Step B2 of the Production Process)

An open-pored polyurethane foam block which had a density of about 0.05 g/cm$^3$ and a pore size of about 5 to 10 mm was used as the support material. The support material was 260 mm long, 188 mm wide and 45 mm high.

500 g of the gold/iron oxide mixture produced in Example 3.1 were introduced into this support in a shaking machine and were then held in place by enveloping the support with woven plastic material. The total weight of the finished support was 627 g.

EXAMPLE 4

Use of the Supported Catalyst Produced in Example 3 for Oxidizing Carbon Monoxide The supported catalyst produced in Example 3 was introduced into a container provided with gas supply and gas removal means. A stream of air having a relative humidity of 60%, a temperature of 8° C. and a carbon monoxide concentration of about 95 ppm was then passed through the supported catalyst in the container at a rate of 50 m$^3$ per hour. After passing through the supported catalyst according to the invention, the carbon monoxide concentration was only about 3 ppm. The carbon monoxide content of the purified gas was accordingly only about 3% of the original carbon monoxide content.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all variations falling within the ambit of the appended claims and equivalents thereof.

What is claimed is:

1. A supported catalyst for oxidizing carbon monoxide at a temperature below about 100° C., comprising a foamed, substantially open-pored organic polymer support, and a catalytically active component applied to said support, said catalytically active component being present as a coating on said foamed polymer support and comprising a mixture of gold and iron (III) oxide, a mixture of gold and tricobalt tetroxide, a mixture of gold and nickel (II) oxide, or a mixture of two or more of the foregoing mixtures, and said supported catalyst being in the form of monolithic bodies having a spatial volume of at least 5 cm$^3$.

2. A supported catalyst according to claim 1, wherein said polymer is a polyurethane polymer.

3. A supported catalyst according to claim 1, wherein said supported catalyst contains from about 5% to about 80% by weight of catalytically active component relative to the total weight of the supported catalyst.

4. A supported catalyst according to claim 3, wherein said supported catalyst contains from about 10% to about 50% by weight of catalytically active component relative to the total weight of the supported catalyst.

5. A supported catalyst according to claim 1, wherein the catalytically active component contains a mixture of gold and iron (III) oxide.

6. A supported catalyst according to claim 5, wherein said catalytically active component contains a mixture of gold and iron (III) oxide having an atomic ratio of gold to iron between about 1:99 and 1:9.

7. A supported catalyst according to claim 6, wherein the atomic ratio of gold to iron in said catalytically active component is between about 1:49 and 1:14.

8. A supported catalyst according to claim 5, wherein the catalytically active component consists of a mixture of gold and iron (III) oxide.

9. A process for producing a supported catalyst for oxidizing carbon monoxide, comprising the steps of:

A) producing a catalytically active component comprising a mixture of a gold compound and an iron (III) compound, a mixture of a gold compound and a cobalt compound, a mixture of a gold compound and a nickel compound, or a mixture of at least two of the foregoing mixtures; calcining the mixture at a temperature above 200° C.; and grinding the resulting solids to particle sizes below about 2 mm, and B) producing a coated supported catalyst by coating a foamed, substantially open-pored organic polymer support with the catalytically active component obtained in step A), said supported catalyst being in the form of monolithic bodies having a spatial volume of at least 5 cm$^3$.

10. A process according to claim 9, wherein a foamed, substantially open-pored organic polymer is used as the support, further comprising pretreating the polymer support or the catalytically active component to improve adhesion of the catalytically active component to a surface of the polymer support prior to coating the polymer support with the catalytically active component.

11. A process according to claim 10, wherein said pretreating comprises treating the polymer support with a solvent causing solubilization of the surface to render the surface tacky.

12. A process according to claim 10, wherein said pretreating comprises applying an adhesive to said polymer support.

13. A process according to claim 10, wherein said pretreating comprises treating the polymer support with a gas which corrodes the surface of the polymer to render the surface tacky.

14. A process according to claim 10, wherein said pretreating comprises heat treating said polymer support to soften and tackify the surface of the polymer support.

15. A process according to claim 10, wherein said pretreating comprises heating the catalyst component, and the support is then contacted with hot catalyst component, whereby heat from the catalyst softens the polymer and promotes adhesion of the catalyst component to the polymer support.

* * * * *